May 3, 1966  H. MORGENROTH  3,248,870
STIRLING CYCLE ENGINE DIVIDED INTO A PRESSURE GENERATING UNIT
AND ENERGY CONVERTING UNIT
Filed July 29, 1960  2 Sheets-Sheet 1
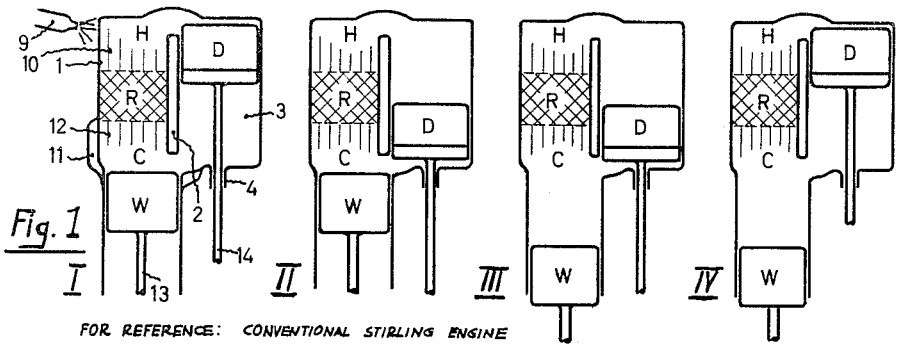
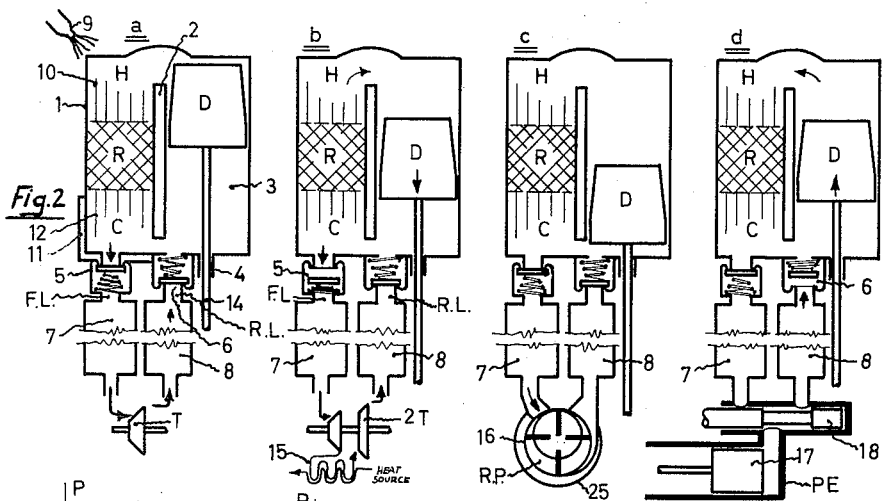
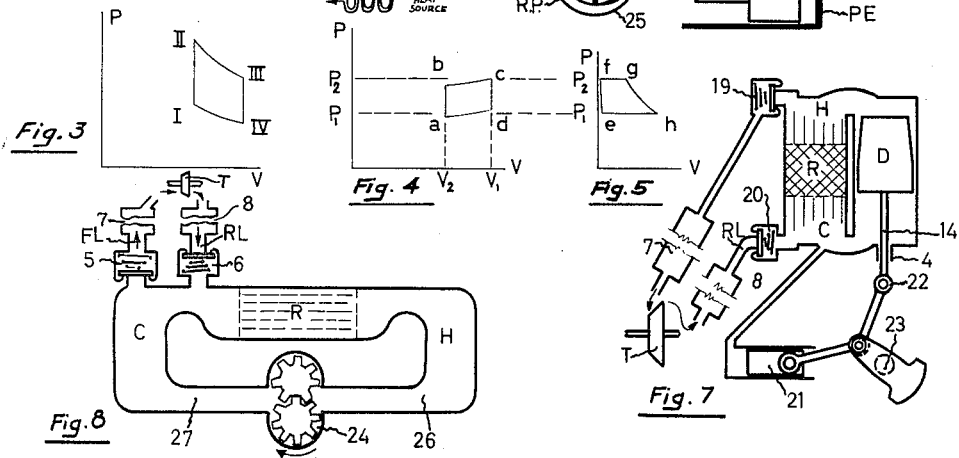
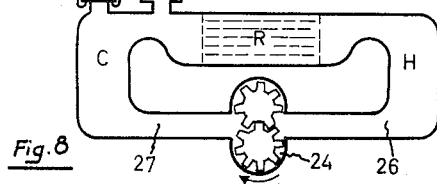
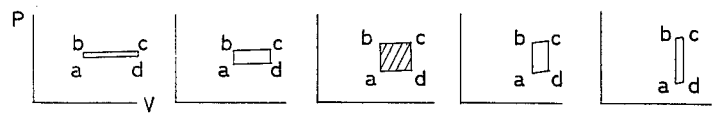
INVENTOR.
HENRI MORGENROTH

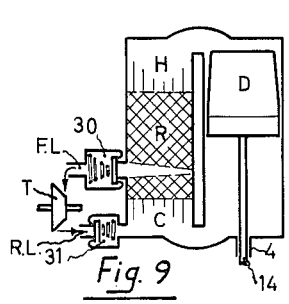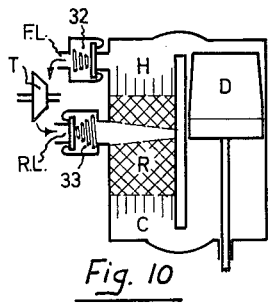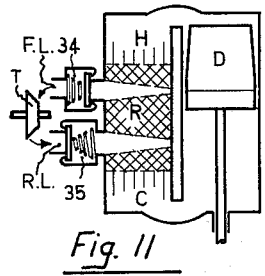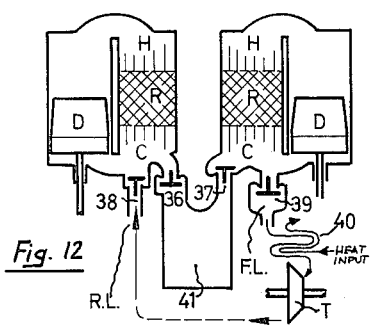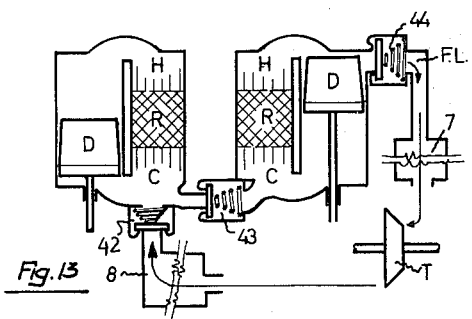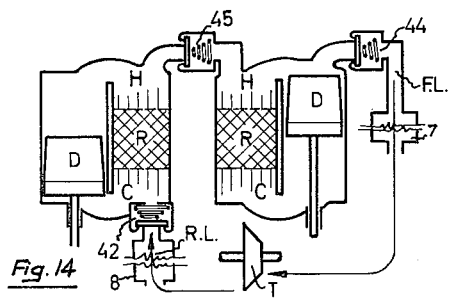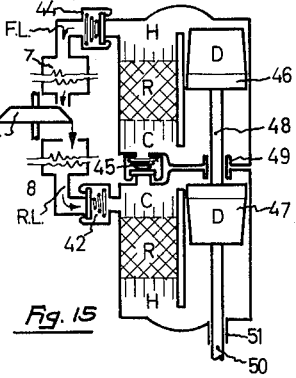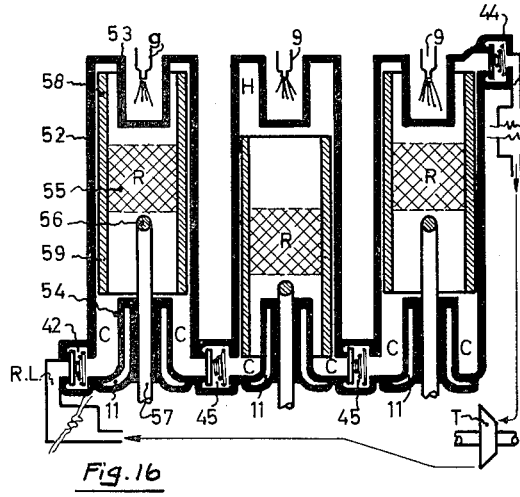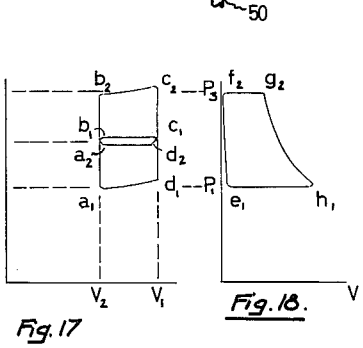
INVENTOR.
HENRI MORGENROTH

3,248,870
STIRLING CYCLE ENGINE DIVIDED INTO A PRESSURE GENERATING UNIT AND ENERGY CONVERTING UNIT
Henri Morgenroth, 3090 Hidden Valley Lane, Santa Barbara, Calif.
Filed July 29, 1960, Ser. No. 46,240
18 Claims. (Cl. 60—24)

My invention relates to Hot Gas Engines and more particularly to the type of closed cycle Hot Gas Engines which includes a regenerator as first used by Robert Stirling. The hot gas regenerator cycle and the engine run with this cycle will hereafter be termed "Stirling Cycle" and "Stirling Engine," since the mostly used terminology "hot gas cycle" and "hot gas engine" also embraces many other cyclic processes to which may intention does not apply.

More specifically, hereafter the terms "Stirling Cycle" and "Stirling Engine" are to be understood to apply to closed cycle gas engines which run on a cycle shown in the simplified and idealized form in FIG. 3, with the help of the basic machine elements shown in FIG. 1. FIG. 1, FIG. 3 and the following short description merely refers to the known Stirling cycle engine and is given here in order to show which kind of hot gas engines my invention is designed to improve.

In FIG. 1, W designates the working piston which does external work in its down-stroke by conventional means not shown in the drawing, such as cranks. D is a displacer piston which does not do any external work. Its sole purpose is to oscillate the gas charge through the hot zone H, the regenerator R and the cold zone C. The hot zone H is heated externally by for instance the burner 9 over fins 10, while the cold zone C is cooled externally by means of a jacket 11 and the fooling fins 12. The regenerator may consist of fine wire mesh and stores heat during the leg III to IV of FIG. 3, and discharges its heat content to the gas during the leg I to II. The leg II to III shows the isothermic expansion of the working piston W, whereas the leg IV to I represents the isothermic compression during the up-stroke of W. In its idealized form, shown in FIG. 3, the working piston W and the displacer piston D move alternately. In actual practice, these pistons move at a phase difference in the order of 90 degrees and the cyclic process has a rounded form which deviates considerably from the idealized form shown in FIG. 3. Likewise, expansion and compression are never run on pure isothermes but rather on polytrops.

Therefore, I want it to be understood that the term Stirling cycle as used hereafter does not refer to the idealized cycle, shown in FIG. 3, but rather embraces all deviations of this idealized cycle as encountered in actual practice. Likewise the engine used to run this Stirling cycle may consist of machine elements of a different design, but fulfilling the same task as those shown in FIG. 1.

The object of the invention is to separate the Stirling engine into two units, one for pressure generation only and consisting of the hot zone, regenerator, cold zone, and displacer piston, while the second unit is for energy conversion only and consists of a piston engine similar for instance to a steam engine or a turbine or a rotary piston engine. This splitting of the Stirling engine into two distinct units is done in order to become independent of the synchronization of the working piston and displacer piston. In the conventional Stirling engine the working piston and displacer piston have to run at the same number of revolutions, separated only by a certain phase difference. It is an object of the invention to make it possible to run the displacer piston and working piston at different speeds and/or any desired phase angle.

The necessity in the conventional Stirling engine to operate the displacer piston and working piston at the same speed, brings with it very severe disadvantages and limitations; the working piston should run at high r.p.m. in order to obtain high engine out-put, whereas the displacer piston should oscillate at a lesser r.p.m., in order to reduce friction and turbulence losses of the gas which is pushed through the fine mesh regenerator and the fins in the hot and cold zone. Thus, in many cases, it would be preferable to have a Stirling engine where the displacer piston can run at its most efficient regime at an r.p.m. which is considerably under that of the working piston. Also, if this asynchronization is made possible, the working piston could be replaced by a turbine or by rotary expansion machinery. Furthermore, with the separation of the Stirling engine into two units, namely a pressure generating unit and an energy converting unit, a flexibility in the installation of large Stirling engine machinery becomes possible, which is comparable to the possibility in steam installations, where the boiler and the steam engine proper are widely separated and connected by pipes only. This is of particular importance for nuclear installations where the hot zone may be heated by fission products.

The splitting of the Stirling engine into a pressure generating unit and an energy converting unit is, according to the invention, accomplished by piping the gas flow to and from the energy converting unit through two different ducts and inserting a check valve in each of these ducts. FIG. 2a shows schematically how this is accomplished. The turbine T is the energy converting unit and is fed from the pressure generating unit consisting of the displacer piston D, the hot zone H, the regenerator R, and the cold zone C through a feeding line FL and return line RL. Inserted into this line is a check valve 5 and a check valve 6. Also inserted in the gas flow are surge chambers 7 and 8.

The separation of the gas flow to and from the energy converting unit and the check valves are very much different from the conventional Stirling engine as shown in FIG. 1, where the gas flow to and from the working piston W goes over the same duct without directional guidance of the check valves.

The result of the separation of the gas flows into a feeding path and return path and the directional forcing of this flow by means of check valves are of major importance. They accomplish the before-mentioned object of the invention to asynchronize the pressure generating unit and the energy converting unit. The modified Stirling engine, according to the invention, can use a turbine or a continuous flow vane type rotary piston engine, both of which are utterly impossible in conjunction with the conventional Stirling engine.

According to the invention, the displacer piston is driven separately at any speed desired to build up a certain pressure difference between the surge chamber 7 and the surge chamber 8. As the displacer piston is cycled back and forth, pressure gas is fed to the duct FL whereas a pressure reduction is achieved in the duct RL. This pressure differential is what is feeding the turbine or other energy converting machinery. It must be understood that the movement of the displacer piston does not "pump" the gases into the pressure vessel 7; rather, this oscillation is similar to the actions of the displacer piston D in the conventional Stirling cycle process, by merely moving the gas through the hot zone, cold zone and regenerator, and doing no other work but that to overcome the gas friction losses. Thus, according to the invention, the Stirling cycle is greatly improved by splitting it into a separate pressure generating cycle and expansion cycle by means of the separate ducting of the gases to and from the energy converting unit and by means of the check valves in these ducts.

The invention will now be explained more fully by reference to the accompanying diagrammatic drawings given by way of example in which:

FIG. 1 shows the conventional Stirling engine, for reference only.

FIG. 2 shows the Stirling engine as modified according to the invention. FIG. 2 gives four different embodiments of the invention for the energy converting units, "a" showing expansion in a single stage turbine, "b" showing expansion in a two-stage turbine, "c" showing expansion in a vane type rotary piston engine, and "d" showing expansion in a piston engine with valving similar to that used in steam engines.

FIG. 3 shows the idealized cyclic process of the conventional Stirling engine of FIG. 1, for reference only.

FIG. 4 shows the idealized cyclic process according to the invention of the pressure generating unit of FIG. 2.

FIG. 5 shows the idealized cyclic process of the expansion in the energy converting unit of FIG. 2.

FIG. 6 gives a series of diagrams as they are obtained by charging the surge chambers by means of the pressure generating unit of FIG. 2.

FIG. 7 shows the addition of machinery to operate the displacer piston.

FIG. 8 shows the embodiment of the invention where the displacer piston is replaced by a gear type pump.

FIGS. 9, 10 and 11 show modifications of the invention where the gas feeding and gas return are tapped off at different points of the heat gradient between the hot and cold zone, FIG. 12 shows a modification of the invention where two pressure generating units are put in series for building up a greater pressure differential.

FIG. 13 shows a modification of the series pressure generation.

FIG. 14 shows another modification of this series shunting.

FIG. 15 shows an arrangement of the series shunted pressure generating units which simplifies the drive mechanism.

FIG. 16 shows a modification of the basic system by means of moving the regenerator rather than a displacer piston.

FIG. 17 shows the idealized diagram obained by putting two pressure generating units in series.

FIG. 18 gives the pressure-volume diagram of the energy converting unit for the higher pressure differential, as obtained by the series shunted pressure generators.

Referring now to FIG. 1 and FIG. 2, identical numbers denote identical parts in the conventional Stirling engine of FIG. 1 and the Stirling engine as modified by the invention of FIG. 2.

A gas of preferably greater than atmospheric density is enclosed in the housing 1 in which is arranged a cylindrical bore 3, in which the displacer piston D is moved up and down. The stuffing box 4 prevents the escape of the gas charge of the container 1 to the outside. The rod 14 connects to the means by which the displacer piston is moved by an outside energy source, not shown in the drawings. It is to be remembered that the displacer piston D does not generate energy but rather has to be moved by a foreign energy source in order to overcome the friction losses occurring when the gas charge sweeps the hot zone, cold zone and the regenerator. The fins 10 are heated by the burner 9 and heat in turn the gases in the hot zone H. The regenerator R is designed in conventional ways for storing heat and releasing heat during the cyclic sweeps of the gas charge through this regenerator. A heat gradient, extending from the hot zone to the cold zone is established in this regenerator and the regenerator is designed to maintain this gradient with a minimum of heat exchange in the direction of the gas flow through the regenerator. The fins 12 are cooled by means of a water jacket or other cooling means symbolized by the double wall at 11, thus extracting heat from the cold zone C.

FIG. 1 shows the conventional Stirling engine in its four basic positions, corresponding to the point I, II, III, IV of the cycle diagram in FIG. 3.

The Stirling engine, according to the invention, as shown in FIG. 2, adds to the conventional device the duct FL which feeds pressure to surge chamber 7 and from there to the turbine T and the duct RL, which evacuates the surge chamber 8, which in turn receives the return flow from the turbine T. Check valves 5 and 6 are arranged in each of these ducts, which maintain the one-way charging- and discharging flow directions to and from the surge chambers.

The example as shown in the drawings uses automatic check valves. It is, however, to be understood that also mechanically operated valves can be used, as long as their opening and closing is timed so that the gas flow is substantially in one direction.

FIG. 2 shows the device in four positions $a$, $b$, $c$ and $d$, which correspond to the four corner points of the pressure volume diagram of FIG. 4. FIG. 4 represents the pressure cycle as it occurs in the pressure generating unit alone.

At the point $a$, the displacer piston D is in a position where previously most of the gas charge has been swept through the cold zone C. Consequently, the gas is contracted to its minimum pressure $P_1$. At the point $b$ the displacer piston has undertaken part of its down stroke; from $a$ to $b$, the gas has been pushed through the regenerator and hot zone to the top of the piston so that finally the pressure $P_2$ is reached, which is the pressure prevailing in the surge chamber 7.

At this point the check valve 5 opens; as the displacer piston now completes its stroke, the gas, being further heated and expanded, will be displaced along the line $b$–$c$ into the surge chamber 7. The slight pressure increase during the leg $b$–$c$ depends on the volume of the surge chamber.

In the return movement from $c$ to $d$, both check valves are closed and part of the gas is swept back through the regenerator giving off part of its heat content, and thence through the cold zone, which extracts more heat. The pressure will be lowered to the value $P_1$, which prevails in the return surge chamber 8.

As $P_1$ has been reached, the return check valve 6 opens and gas is discharged from the surge chamber 8 back into the pressure generating unit as shown in the leg $d$–$a$ of the diagram FIG. 4.

FIG. 5 gives a pressure volume diagram of the energy converting unit. This diagram will be essentially the same for all of the energy conversion devices which are shown in four different forms of execution in FIG. 2.

For the explanation of the diagram FIG. 5, the piston engine in section "$d$" of FIG. 2 shall be used.

PE is the piston engine, with a working piston 17 and a double-acting sliding valve 18 which is operated in the way the inlet and exhaust valve of a steam engine functions:

At the beginning of the down-stroke of the piston 17, the slide valve 18 connects to the surge chamber 7, which is at the pressure $P_2$. During this part of the working stroke the diagram leg $f$–$g$ will be accomplished.

At the point $g$ the valve 18 closes and expansion takes place on the adiabate or polytrop $g$–$h$.

At point $h$ the piston has reached its lower dead center, the sliding valve opens now to the surge chamber 8 and the isobare $P_1$ from $h$ to $e$ follows.

At the point $e$ the valve 18 closes, and the point $f$ at the pressure $P_2$ is reached again.

The areas of the diagrams FIG. 4 and FIG. 5 have to be equal for balanced input and output of the pressure generating unit and the energy converting unit.

In FIG. 2, the four pressure generating units $a$, $b$, $c$ and d are fitted with four different energy converting units, in order to show different methods of execution.

In FIG. 2a, a single stage turbine T is shown.

In FIG. 2b, a two-stage turbine is shown with heat input 15 between the two stages, consisting of a counter-flow heat-exchanger. This heat input may be important to match the temperatures of the gas return to that of the cold zone.

In FIG. 2c, a vane type rotary piston mechanism is shown. It is one of the advantages of the invention that this simple completely balanced expansion unit can be used rather than a reciprocating piston as in the conventional Stirling engine, since, contrary to the conventional Stirling engine, a continuous flow of pressure gas is available. A peculiarity of the Stirling cycle is that the working piston is fed from the cold zone; despite this expansion of cold gases the theoretical Carnot efficiency calculated between the hot and cold zone can still be obtained, due to the action of the regenerator. Thus, also in the Stirling engine as modified according to the invention, it is possible to use cold gases to do the work in the energy converting unit. This in turn makes the use of vane type expanders possible. This is in great contrast to internal combustion engines where the thermal loads on rotary vanes have made the use of vane type rotary engines impractical.

A heat exchanging jacket 25 is schematically shown to be wrapped around the rotary piston housing 16. A flow of heat-carrying liquid is directed through this jacket, which serves to establish an isothermic expansion of the gases. Without this heat input, the expansion would be adiabatic and the gases returned from the surge chamber 8 would be cooled under the cold zone temperature. An irreversible step would result which lowers the thermodynamic efficiency. In the turbine a comparable heat input is possible only by means of the heat exchanger 15 between two stages as shown in FIG. 2b.

In FIG. 2d, a steam engine type of energy converting unit is shown, the function of which has already been previously explained.

The five diagrams in FIG. 6 show what happens if the pressure generating unit is started out from equal charge in both surge chambers and is worked until the maximum pressure differential between the surge chambers is established.

In order to explain the operation, it is assumed that no pressure is taken out at all by the energy converting unit.

When the displacer piston starts its operation, the pressures in the two surge chambers are equal. A volume of gas is pushed into the surge chamber 7, along the line b–c of the first diagram, and likewise the volume d–a is evacuated from the surge chamber 8. The first diagram has not yet any useful area.

As the operation goes on, a higher pressure is obtained and the legs b–c and d–a become shorter while the pressure legs a–b and c–d become longer.

Finally, maximum pressure is reached, as shown in the last diagram of FIG. 6. Since the maximum pressure is reached only at the end of the displacer piston stroke, no volume is displaced anymore and the work area becomes again zero.

The cross-hatched area of the third diagram in FIG. 6 represents the area where a maximum amount of gas useful for energy conversion is made available. For maximum output, this area should be equal to the diagram area of FIG. 5 of the energy converting unit.

It is important to realize that a mismatch of these areas does not necessarily make complicated controls necessary; if the energy converting unit uses less pressure gas than that produced in the cross-hatched diagram of FIG. 6, the pressure simply increases until the diagram area has again reached a reduced size, as for instance that of the fourth diagram. Indeed, it is possible to use this automatic tendency to reach matching input and output for control purposes.

As mentioned before, the displacer piston has to be moved by a foreign energy source, which could, of course, be of many different designs.

FIG. 7 shows as an example how the displacer piston is operated by means of a conventional Stirling cylinder 21. The main difference against the conventional Stirling engine is, that the cylinder 21 is of a very small size, since its task is only to overcome the internal frictions in the pressure generating unit. A device according to FIG. 7 has two energy converting units; one conventional one, which can be small and of low r.p.m., since it is only called upon to overcome internal energy losses, and the second one (turbine T), which is supplied by pressure gas over the parts forming the invention and which will be the energy converting unit proper.

It is to be understood that the Stirling engine of conventional design, which moves the displacer piston, could be used to drive accessories, or in certain cases do a certain amount of external work if this appears to be advantageous; the percentage of work done by the conventional Stirling engine and by the turbine 7, that is the energy converting unit proper, is of no basic importance to the principal of the invention, as long as the advantages which the independently running energy converting unit according to the invention offers, are fulfilled.

FIG. 8 shows a pressure generating unit which is possible only in conjunction with the ducting and valving according to the invention. The pressure generating unit is, in this embodiment of the invention, preferably for large installations. The gas filling is moved by means of a rotary pump 24, rather than a displacer piston. In order to oscillate the gas back and forth, either the pump's rotational direction can be reversed or suitable valving can be arranged, which allows to reverse the flow without reversing the sense of rotation of the pump. The reversal should take place after circulation of not more than one gas charge. Adjoining the pump, means have to be used which prevent mixing of the gases stacked up in a temperature gradient. These means can simply consist of long tubing 26 and 27 on each side of the pump. Also it is possible to fill this tubing 26 and 27 with liquid so that a liquid piston will be oscillated by means of the pump 24. This liquid piston will in turn oscillate the gas charge in the cold zone, hot zone and regenerator.

Referring back to FIG. 1, it will be noticed that the conventional Stirling cycle taps the gases going to the working piston off the cold zone. As mentioned before, the Stirling cycle is the only cyclic process where the working gas expanding in the working cylinder can be at a lower temperature than the source temperature, that is in this case the temperature of the hot zone, and yet have the Carnot efficiency of $T_2-T_1/T_2$. As also briefly mentioned before, this is due to the regenerator.

Conventional Stirling cycle engines, especially of the opposed piston type, are also known which directly expand hot gases at the hot zone.

Whether the working piston receives its gases from the hot or cold zone, in either case the expansion and recompression is approximately isothermic. In the idealized case, shown in the diagram in FIG. 3, Carnot efficiency is obtained in either case.

In the Stirling cycle process as modified according to the invention and as shown in FIG. 2a, the expansion in the turbine is, however, adiabatic, so that the return gases in the surge chamber 8 have a lower temperature than the feed gases in the surge chamber 7. This temperature step creates an irreversible mismatch where the gases are fed back into the cold zone. Thermodynamics teaches that any irreversible step lowers the efficiency below that of the Carnot cycle.

Consequently, it is a further aim of the invention to eliminate this disadvantage and come back up as closely as possible to Carnot efficiency.

One way of doing this is by feeding heat to the duct 7 before the turbine or to the duct 8 behind the turbine. If low temperature heat is available anyhow. this is quite a good method. However, the heat input takes place at close to $T_2$ so that the overall efficiency is bound to be lowered. The heat input between two stages of the arrangement, shown in FIG. 2b, or the jacket of the rotary piston engine, shown in FIG. 2c, serves the same purpose.

It is also possible to both feed and return from the hot zone.

Calculations have shown that with this arrangement the ratio of the size of the regenerator to the output of the energy converting unit becomes better. The irreversible mismatch due to adiabatic expansion can here be avoided by shunting a heat exchanger between the hot zone and the turbine (or other energy converting unit), which raises the input temperature to the turbine above that of the hot zone.

However, with engines running with a high source temperature, this arrangement should be avoided since a major advantage of the Stirling cycle engine, as modified according to the invention, is that the turbine or the rotary piston engine can be run at low temperature. However, for solar heat installations or other applications with relatively low heat source temperature, this will be the preferred arrangement.

FIG. 7 shows still another arrangement where the turbine feed is tapped off the hot zone and the return from the turbine feeds into the cold zone. Calculations have shown that the adiabatic temperature drop across the turbine is considerably lower than the temperature difference between the hot and cold zone. Consequently, with this arrangement, there also exists an irreversible mismatch; the gases coming from the turbine, stored in the surge chamber 8, are hotter than the cold zone so that the irreversible cooling off constitutes a complete loss.

Referring now to FIGS. 9, 10 and 11, these show a novel arrangement according to which the irreversible temperature mismatch can be avoided without resorting to the addition of the heat exchangers as explained before. This is accomplished by means of proper selection of various tap-off points along the heat gradient extending from the hot zone, through the regenerator, to the cold zone.

In FIG. 9, the feed line FL, which feeds the turbine taps off at a point on the regenerator gradient, which lies somewhere inbetween the hot and cold zone.

It has been explained before that the adiabatic pressure drop through the turbine is less than the temperature difference between the hot and cold zone. By tapping off at a lower point of the temperature gradient of the regenerator, a complete matching of the temperature drop through the turbine and the temperature difference between point 30 and 31 can be obtained, thus eliminating the irreversible step which lowers the efficiency under the maximum of the Carnot cycle.

FIG. 10 shows a modification of the same principle where the turbine is fed from the hot zone through the check valve 32 and the return takes place through the check valve 33 at a proper point on the regenerator gradient. As mentioned before, the tapping off the hot zone is a preferred arrangement for operation with low heat source temperature such as solar heat engines.

It also has been mentioned before that feeding the turbine or energy converting units from higher temperature improves the ratio between the amount of heat penduling back and forth in the regenerator to the amount of heat converted into energy. It, therefore, is frequently desirable to run the turbine or another energy converting unit not from a relative cold temperature, as shown in FIG. 9, but from a somewhat higher temperature, which is still tolerable for the turbine buckets or the vane type pistons. An arrangement, which taps the heat off at the higher appropriate place on the regenerator, is shown in FIG. 11. To avoid a mismatch and irreversible step at the return point, the return line does not feed back into the cold zone but into another matching point on the heat gradient.

Thus, it will be understood that the particular location of the gas-tap point on the heat gradient between the hot zone and the cold zone is dictated by practical consideration and that the invention provides a means to obtain great freedom of selection of the tap-off point and yet preserve the highest possible efficiency by selecting the proper spread on the heat gradient between the feed line tap point and the return line tap point on that gradient.

Referring now to FIGS. 12–18, another improvement of the invention is shown which consists in shunting pressure generating units in series. By doing this, high pressure differences between the feed line and the return line can be obtained even with moderate temperature difference between the heat source and the heat sink. The following consideration explains why this is important:

FIG. 6, which represents the charging diagram of a single pressure generating unit, shows that the maximum pressure difference between the feed and the return line is obtained in the fifth diagram. Here the pressure difference is proportional to the average absolute temperature difference in the entire housing 1, at the two end positions of the displacer piston. In order to obtain a work doing area of practical size, this already low pressure difference has to be even more reduced, as shown in the third diagram of FIG. 6. While this lower pressure difference has no influence on the theoretical thermodynamic efficiency, it does, however, have a detrimental effect on the size of the machinery to get a certain amount of power, especially if, as in applications for solar heat, the temperature difference between source and sink is relatively low.

The series shunting according to FIGS. 12–18 avoids the disadvantage of an impractically low pressure difference and makes it possible to obtain high pressure differences even for small temperature differences, thus reducing the size of the turbine or piston engine.

Referring now to FIG. 12, it will be seen that the delivery valve 36 of the first pressure generating unit does not feed into the turbine but rather into an intermediate surge chamber 41 which in turn feeds into the intake valve 37 of the next higher pressure generating unit.

FIG. 17 shows the diagram which is obtained by putting the two units in series. The first pressure generating unit has a diagram going from $a_1$ to $b_1$ to $c_1$ and $d_1$, whereas the second unit goes from $a_2$ to $b_2$ to $c_2$ and finally $d_2$. The pressure $P_2$ is the highest pressure obtained from the first pressure generating unit and it represents at the same time the lowest pressure of the next pressure generating unit, except for a slight drop through the ducting and valving.

FIG. 18 shows that a turbine fed from this high pressure difference gives a proportionally larger work area.

Only the arrangement according to the invention permits to build up the pressure difference by shunting displacer units in series. With the conventional Stirling engine this is not possible; it is, however, known to oscillate a gas charge between two different pistons and do this in a fashion which might be mistaken to be series shunting since the lower part of one piston pushes the gas to the upper part of the next one. However, each piston drives its own connection rod and crank, which thus operate parallel and a pressure multiplication is not obtained in this arrangement. Aside of the fact that two pistons co-operate with each other in oscillating the gas, no change against the basic function of parallel shunted conventional Stirling engines is obtained. Consequently, the separation of the Stirling cycle into the pressure generating units and energy converting units, according to the invention, provides an entirely new possibility to obtain high working pressure differences with series shunting, despite low temperature differences.

The higher pressure drop through the turbine or other energy converting unit will multiply the adiabatic temperature drop.

Consequently, heat exchange as shown schematically at point 40 of FIG. 12 will be frequently advantageous.

Another arrangement is shown in FIG. 13. Here the feed pressure is tapped off by means of the check valve 44 at the hot zone of the last pressure generating unit while the check valve 42 returns the gases to the cold zone of the first pressure generating unit.

A similar arrangement in which the turbine is fed from the hot zone and the expanded gas returned to the cold zone has been shown before in FIG. 7. It has been pointed out that this connection results in low thermodynamical efficiency, since the adiabatic pressure drop through the turbine is usually only a fraction of the temperature difference between the hot zone and the cold zone.

A major advantage and, indeed, reason for the series shunting of the pressure generating unit is, that this mismatch can be avoided. For the same temperature difference between the hot and cold zones, as shown in FIG. 7, a doubled pressure difference between the surge chamber 7 and surge chamber 8 can be obtained with the arrangement shown in FIG. 13. Thus, in FIG. 13, the adiabatic temperature drop will be nearly doubled while the temperature difference between the hot and cold zone remains unchanged. By proper selection of the number of shunt-in-series pressure generating units, a matching of the temperature difference between the feed line to the turbine and the return line from the turbine to the temperature difference between the hot zone and cold zone can now be obtained. This matching will usually not take place with merely two units, as shown for simplicity reasons in the drawing, but can always be obtained by using a sufficiently high number of in-series working pressure generating units.

FIG. 13 shows another innovation against the arrangement of FIG. 12. As mentioned before, FIG. 12 has surge chamber 41 between the two pressure generating units and a valve 36, which feeds into this surge chamber and another valve 37, which delivers from this surge chamber.

In FIG. 13, the displacer pistons are driven at 180 degree phase difference, in order to eliminate completely a surge chamber between the two units; the highest pressure in the first unit is just obtained when the next unit is in its low pressure position. It is also possible with this arrangement to eliminate one of the check valves and arrange only a single check valve 43 between the two pressure generating units.

FIG. 14 shows a modification in the arrangement of FIG. 13, inasmuch the series shunting is not done between cold zones but rather between hot zones.

FIG. 15 shows an arrangement which, in its shunting, is the equivalent to that shown in FIG. 13 and which explains a simplified drive mechanism. The displacer pistons 47 and 46 are driven with a common push-rod 48, through a stuffing box 49. Both displacer pistons are moved by a common drive mechanism which operates on the lower push rod 50 reaching through the stuffing box 51. The cold zones are located adjoining each other and the hot zones are located on opposite ends. Only a single check valve 45 is arranged between the two adjoining cold zones. By means of the inverted location of the zones in both cylinders, 180 degree phase-different operation is obtained, despite the motion of both displacer pistons in the same direction.

FIG. 16 explains a modification of the invention which can be used in conjunction with all the different forms of execution as shown in all the drawings. This simplified design eliminates the displacer piston and uses instead a moveable regenerator 55.

This regenerator is oscillated by means of a push rod 57 and slides in a bore 52. It can easily be understood that oscillation of the regenerator through a stationary gas column has basically the same effect as the oscillation of a gas column by means of a displacer piston through a stationary regenerator.

On disadvantage of such an arrangement is, however, that the regenerator in its oscillating path alternately sweeps over hot and cold walls on opposite ends of its cylinder bore. Since the temperature gradient in the regenerator should not be disturbed by conduction, this contact with walls of varying temperature would cause a loss. To avoid this loss, the regenerator is attached to a cylindrical liner 58 which oscillates together with the regenerator. This liner projects by about the amount of the stroke on each side of the regenerator. Thus, a contact of the gases of the hot zone and cold zone with the different temperatures in the cylinder bore is avoided.

Another difficulty with the arrangement of an oscillating regenerator is that, as mentioned before, the gas column will be stationary, thus reducing the heat conduction from the outside to the hot- and cold-zones. A strong scrubbing of the gases on the hot and cold zone walls is necessary in order to obtain sufficient heat inflow and outflow.

In order to promote a movement of the gases, the hot and cold zone walls are fitted with dished-in cavities 53 and 54. The oscillating liner 58 is designed with a considerable wall thickness so that it acts as a gas displacer in the annular cavity formed by the disk 53 in the hot zone and the disk 54 in the cold zone.

Thus the liner moving with the regenerator has a double purpose: First it prevents heat conductions from the wrong points of the cylinder wall and secondly it promotes localized scrubbing gas movement in the hot and cold zones in order to establish proper heat conduction in these zones.

The arrangements shown in all the figures display a surge chamber 7 which feeds into the energy converting unit, and a surge chamber 8 which receives the return gases from the energy converting unit. The size of these surge chambers can be reduced or, indeed, these surge chambers can altogether be eliminated by shunting two or more pressure generating units in parallel with proper phase-different operation. The delivery valve is open only about 90 degrees of the cycle. By using for instance four pressure generating units in parallel, with 90 degree phase difference, a continuous flow into the turbine or other energy converting units can be obtained if the surge chambers are completely eliminated.

With the series-shunted pressure generating units this same arrangement is possible. Here series shunted groups of pressure generating units would be in turn shunted in parallel: For instance a series shunted group of three units would be four times repeated and each series-group would work on a 90 degree phase difference from its parallel shunted group.

It will be understood that many combinations of the features shown in the drawing are possible, which are different from the combination shown in the examples. The basic concept of the invention and its improvements is not changed by using the elements of this invention in different combinations.

Also the machine elements, such as valves or the displacer piston, can be designed by using mechanisms known to the art which are different from those shown in the drawings but fulfilling the same purpose, without changing the basic concept of the invention.

It is also possible to use the devices according to the invention for heat pumps and refrigeration.

I claim:

1. A Stirling cycle engine, being divided into at least one pressure generating unit, and at least one energy converting unit, said pressure generating unit having a gas filled housing, arranged within this housing a hot zone, a cold zone, a regenerator located between these zones and gas displacing means for oscillating the gas charge through the regenerator and the hot and cold zone; said energy converting unit being operable independently of the cyclic rate of said pressure generating unit; and comprising gas driven motor means to partly expand a gas charge, said energy converting unit being connected to said pressure generating unit by means of at least one gas feed line and at least one gas return line, at least one valve being arranged in the gas feed line, and at least one valve being arranged in the gas return line, these valves permitting the gas flow in substantially one direction only through said gas driven motor means.

2. A Stirling cycle engine according to claim 1 having an additional energy converting unit comprising means to expand a gas charge, said additional energy converting unit driving the oscillating gas displacing means in the pressure generating unit.

3. A Stirling cycle engine according to claim 1 in which the oscillating means in the pressure generating unit consist of at least one rotary pump, said pump being provided with means to reverse the flow at or before the displacement of a volume equal to the volume of the gas charge of said pressure generating unit.

4. A Stirling cycle engine according to claim 1 having surge chambers in said gas feed line and said gas return line.

5. A Stirling cycle engine according to claim 1 in which the gas feed line and the gas return line are connected to the temperature gradient extending from the hot zone, through the regenerator to the cold zone, at two points of said gradient which substantially match the gas temperature difference between the gas feed line and gas return line.

6. A Stirling cycle engine according to claim 1 having at least two pressure generating units connected in series and having at least one one-way valve arranged in each interconnection between these pressure generating units so that at least one pressure generating unit is charged during the low pressure period of its cycle by the preceding pressure generating unit during the high pressure period of its cycle.

7. A Stirling cycle engine according to claim 6 in which the cold zones of the pressure generating units are connected, having at least one one-way valve arranged in said connection.

8. A Stirling cycle engine according to claim 6 in which the hot zones of the pressure generating units are connected, having at least one one-way valve arranged in said connection.

9. A Stirling cycle engine according to claim 6 in which the feed line of the energy converting unit connects to the hot zone of that pressure generating unit which is charged to the highest density and in which the return line from the energy converting unit connects to the cold zone of that pressure generating unit which is charged to the lower density and having such a number of pressure generating units arranged in series that the temperature difference between the gas feed line and gas return line matches the temperature difference between the hot and cold zones to which said gas feed line and said gas return line are connected.

10. A Stirling cycle engine according to claim 6 in which single one-way valves are arranged in each interconnection between two pressure generating units and in which these interconnected pressure generating units operate with substantially 180° phase difference against each other.

11. A Stirling cycle engine according to claim 6 in which one surge chamber is arranged in the gas path between each pressure generating unit and in which one one-way valve is arranged in the gas flow to said surge chamber and a second one-way valve is arranged in the gas flow out of said surge chamber.

12. A Stirling cycle engine according to claim 6 with pairs of pressure generating units adjoining each other at zones of equal temperatures and with its gas displacing means being directly coupled to each other.

13. A Stirling cycle engine according to claim 1, in which a movable regenerator oscillates through the gas charge.

14. A Stirling cycle engine according to claim 13 in which a sleeve surrounds the oscillating regenerator and oscillates in unison with the regenerator, said sleeve fitting into the housing of the pressure generating unit with a sliding fit, and said sleeve having extensions beyond the regenerator.

15. A Stirling cycle engine according to claim 14 having annular cavities in the hot zone and in the cold zone into which said sleeve extension enters at the end of the regenerator stroke.

16. A Stirling cycle engine, comprising: a pressure generating unit including, a gas filled housing a regenerator disposed within said housing and dividing said housing into a hot zone and a cold zone, and gas displacing means for oscillating the gas charge back and forth from one of said zones to the other through the regenerator, said pressure generating unit developing a pressure differential between said hot zone, regenerator and cold zone; and an energy converting unit comprising gas driven motor means, means to partly expand a gas charge, a gas feed line connecting said energy converting unit to said pressure generating unit, a gas return line connecting said energy converting unit to said pressure generating unit, a valve in said gas feed line, and a valve in said gas return line, said valves permitting the flow of gas in substantially one direction from said pressure generating unit to said energy converting unit and thence back to said pressure generating unit; said pressure generating unit being operable independently of said energy converting unit.

17. A Stirling cycle engine according to claim 16 in which the gas feed line and the gas return line are connected to the pressure generating unit at the temperature gradient extending from the hot zone through the regenerator to the cold zone at two points of said gradient which substantially match the gas temperature difference between the gas feed line and gas return line.

18. A Stirling cycle engine, comprising: a pressure generating unit including, a gas filled housing, a regenerator disposed within said housing and dividing said housing into two zones, one of said zones being a hot zone and the other a cold zone, and gas displacing means for osciliting the gas charge back and forth from one of said zones to the other through the regenerator, there being regions of different temperatures and pressures in said pressure generating unit; and an independent energy converting unit comprising gas driven motor means to partly expand a gas charge, a gas feed line connecting one temperature region of said pressure generating unit to said energy converting unit, a gas return line connecting said energy converting unit to a different temperature region of said pressure generating unit, a valve in the gas feed line, and a valve in the gas return line, said valves permitting the flow of gas in substantially one direction from the said pressure generating unit to said energy converting unit and thence back to said pressure generating unit.

References Cited by the Examiner

UNITED STATES PATENTS

| | | | |
|---|---|---|---|
| 2,616,249 | 11/1952 | DeBrey | 60—24 |
| 2,657,553 | 11/1953 | Jonkers | 60—24 X |
| 2,724,248 | 11/1955 | Finkelstein et al. | 62—6 |
| 2,828,601 | 4/1958 | Meijer | 60—24 |

SAMUEL LEVINE, *Primary Examiner.*

JULIUS E. WEST, ROBERT R. BUNEVICH,
*Examiners.*

L. E. CARNAHAN, *Assistant Examiner.*